(12) United States Patent
Song et al.

(10) Patent No.: US 7,661,869 B2
(45) Date of Patent: Feb. 16, 2010

(54) BACKLIGHT ASSEMBLY AND DISPLAY DEVICE HAVING THE SAME

(75) Inventors: Chun-Ho Song, Seoul (KR); Sang-Yu Lee, Yongin-si (KR); Gi-Cherl Kim, Yongin-si (KR); Seock-Hwan Kang, Suwon-si (KR); Joo-Woan Cho, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/488,357

(22) Filed: Jul. 18, 2006

(65) Prior Publication Data

US 2007/0046617 A1    Mar. 1, 2007

(30) Foreign Application Priority Data

Aug. 29, 2005    (KR) ...................... 10-2005-0079262

(51) Int. Cl.
    *F21V 7/04*    (2006.01)
(52) U.S. Cl. .......................... 362/632; 362/633; 349/58
(58) Field of Classification Search ................ 362/632, 362/633, 29, 30, 33, 97, 227, 294, 611, 612, 362/559, 561, 634; 349/62, 56, 58, 59, 61, 349/69, 70
See application file for complete search history.

(56) References Cited

U.S. PATENT DOCUMENTS

| | | | | |
|---|---|---|---|---|
| 6,089,739 A | * | 7/2000 | Yamamoto et al. | 362/561 |
| 6,871,979 B2 | * | 3/2005 | Mai | 362/241 |
| 6,880,947 B2 | * | 4/2005 | Hsieh et al. | 362/614 |
| 6,997,582 B2 | * | 2/2006 | Yang et al. | 362/373 |
| 7,101,055 B2 | * | 9/2006 | Hsieh et al. | 362/29 |
| 7,210,842 B2 | * | 5/2007 | Chen et al | 362/632 |
| 7,338,194 B2 | * | 3/2008 | Chen | 362/560 |
| 2005/0180142 A1 | * | 8/2005 | Tsai | 362/294 |
| 2006/0098441 A1 | * | 5/2006 | Chou | 362/294 |
| 2006/0187660 A1 | * | 8/2006 | Liu | 362/294 |
| 2006/0285037 A1 | * | 12/2006 | Tsai et al. | 349/115 |

* cited by examiner

*Primary Examiner*—Hargobind S Sawhney
(74) *Attorney, Agent, or Firm*—Cantor Colburn LLP (57) ABSTRACT

A backlight assembly includes a light-generating unit, a heat-radiation member, a first receiving container, and a second receiving container. The heat-radiation member is disposed under the light-generating unit and radiates heat generated by the light-generating unit. The first receiving container is composed of a bottom portion and side portion extended from the bottom portion. The first receiving container has an opening formed through partial removal of the bottom portion so that the heat-radiation member received inside is exposed. The second receiving container is disposed under the first receiving container. An air layer is formed in between the first and second receiving containers.

18 Claims, 6 Drawing Sheets

BACKLIGHT ASSEMBLY AND DISPLAY DEVICE HAVING THE SAME

This application relies for priority upon Korean Patent Application No. 2005-79262 filed on Aug. 29, 2005, the contents of which are herein incorporated by reference in its entirety.

BACKGROUND OF THE INVENTION

1. Field of the Invention

The present invention relates to a backlight assembly and a display device having the backlight assembly. More particularly, the present invention relates to a backlight assembly capable of enhancing efficiency of radiation of heat and intensity and a display device having the backlight assembly.

2. Description of the Related Art

Generally, a display device changes electric data processed by an electric data processing device into images. Examples of the display device include a cathode ray tube (CRT), a plasma display panel (PDP), a liquid crystal display (LCD), an electro luminescence (EL), etc. The liquid crystal display device is a flat panel display device that uses electrical and optical properties of liquid crystal in order to display images. The liquid crystal display device has various characteristics such as a thin thickness, a lightweight, a low driving voltage, low power consumption, etc. Therefore, the liquid crystal display device has been widely applied to various industries.

In the above liquid crystal display device, a liquid crystal panel of the liquid crystal display device is not a self-emissive light element. Therefore, backlight assembly is required in order to supply an artificial light.

Conventional liquid crystal display devices mainly employ a light source generating white light. Examples of the light source generating white light include a cold cathode fluorescent lamp (CCFL) and a flat fluorescent lamp (FFL). A backlight assembly employing light-emitting diodes generating red, green or blue light as a light source has been developed to enhance a color reproduction. A monochrome light generated by the light-emitting diodes generating a red, green or blue light is well matched with a color filter of liquid crystal panel and enhances a color reproduction.

However, many light-emitting diodes are required for luminance uniformity because light-emitting diodes generate a light having a limited range of angle. Therefore, manufacturing cost is increased and light efficiency is decreased. The light-emitting diodes generating a red, green or a blue light are disposed as close as possible to each other to mix the red, green and blue lights to form white light, so that heat generated by the light-emitting diodes is concentrated in narrow area, thereby decreasing a luminance.

BRIEF SUMMARY OF THE INVENTION

An exemplary embodiment provides a backlight assembly that enhances efficiency of radiation of heat generated by light-emitting diodes and intensity.

Another exemplary embodiment provides a display device having the backlight assembly.

In one exemplary embodiment a backlight assembly includes a light-generating unit, a heat-radiation member and a first receiving container. The light-generating unit includes a plurality of point light sources generating light. The heat-radiation member is disposed under the light-generating unit and radiates heat generated by the light-generating unit. The first receiving container includes a bottom portion and a side portion extended from the bottom portion. The bottom portion of the first receiving container has an opening exposing a portion of the heat-radiation member.

In one exemplary embodiment a backlight assembly includes a light-generating unit, a heat-radiation member, a first receiving container and a second receiving container. The light-generating unit includes a plurality of point light sources generating light. The heat-radiation member is disposed under the light-generating unit and radiates heat generated by the light-generating unit. The first receiving container includes a bottom portion and a side portion extended from the bottom portion. The bottom portion of the first receiving container has an opening exposing a portion of the heat-radiation member. The second receiving container is disposed under the first receiving container. An air layer is defined between the first and second receiving containers.

In another exemplary embodiment, a display device includes a backlight assembly and a display panel. The backlight assembly includes a light-generating unit, a heat-radiation member, a first receiving container, and a second receiving container. The light-generating unit includes a plurality of light sources generating light. The heat-radiation member is disposed under the light-generating unit and radiates heat generated by the light-generating unit. The first receiving container includes a bottom portion and a side portion extended from the bottom portion. The bottom portion of the first receiving container has an opening exposing a portion of the heat-radiation member. The second receiving container is disposed under the first receiving container. An air layer is defined between the first and second receiving containers.

In another exemplary embodiment, the heat-radiation member makes direct contact with the air layer through the opening, so that heat conveyed to the heat-radiation member is radiated outside by an air circulation. Therefore, efficiency of radiation of heat is enhanced.

BRIEF DESCRIPTION OF THE DRAWINGS

The above and other features and advantages of the present invention will become readily apparent by reference to the following detailed description when considered in conjunction with the accompanying drawings, in which.

DETAILED DESCRIPTION OF THE INVENTION

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "upper," "under" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "upper" relative to other elements or features would then be oriented "lower" the other elements or features. Thus, the term "upper" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 1:
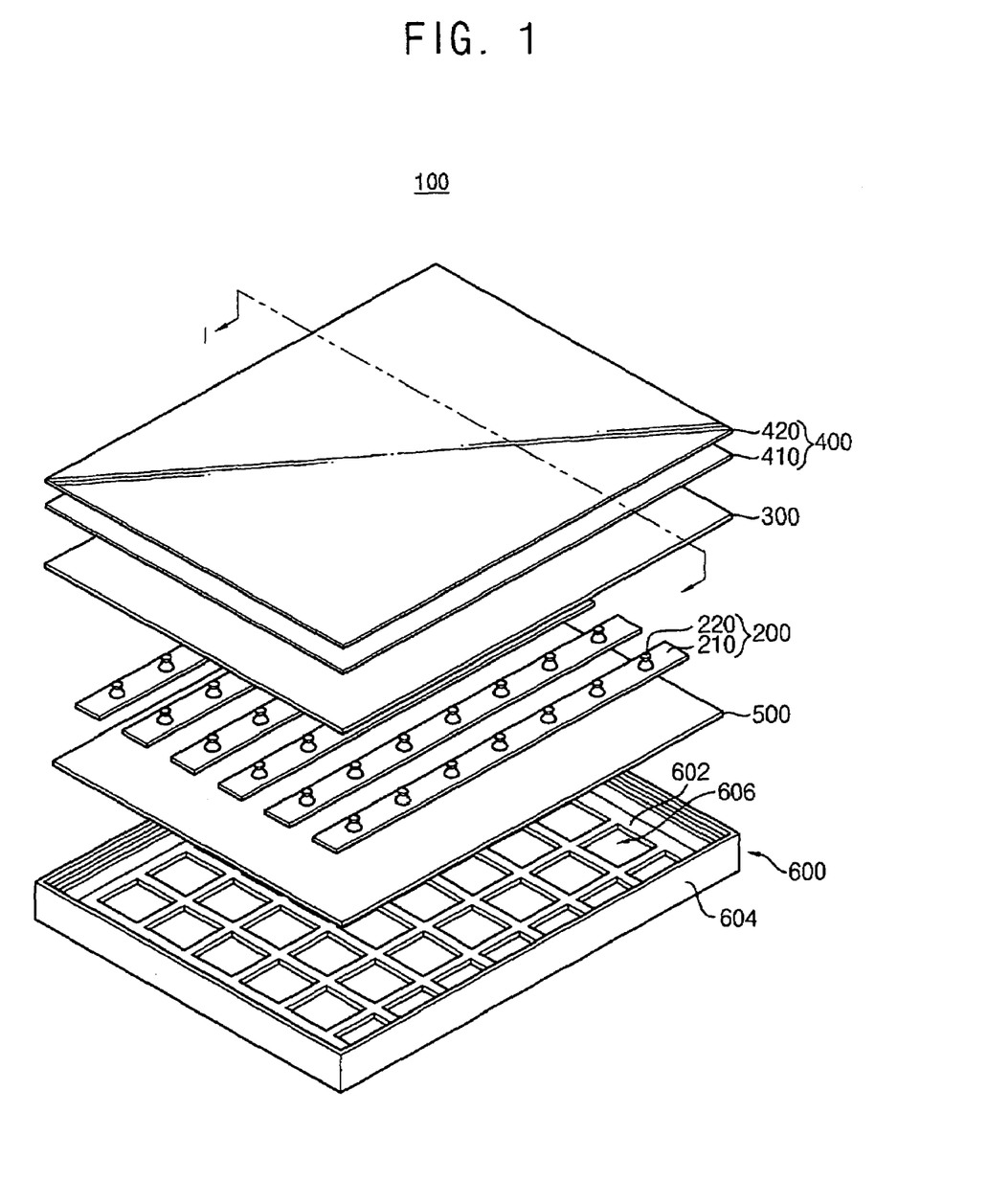
FIG. 1 is an exploded perspective view illustrating an exemplary embodiment of a backlight assembly according to the present invention.
Figure 2:
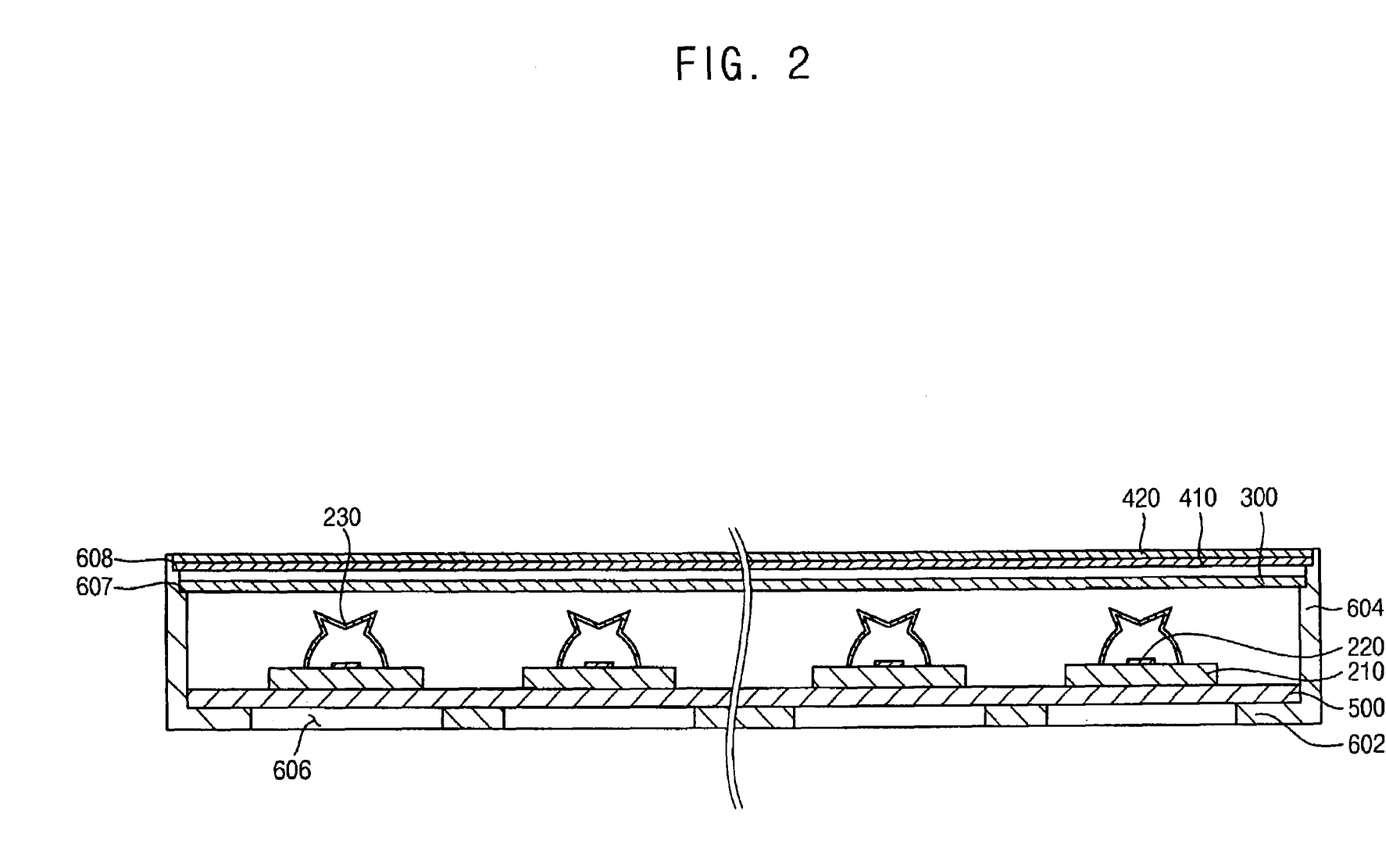
FIG. 2 is a cross-sectional view taken along line I-I' shown in FIG. 1.

FIG. 1 is an exploded perspective view illustrating an exemplary embodiment of a backlight assembly according to the present invention. FIG. 2 is a cross-sectional view taken along line I-I' shown in FIG. 1.

Referring to FIG. 1 and FIG. 2, a backlight assembly 100 includes a light-generating unit 200, a light guiding member 300, an optical member 400, a heat-radiation member 500 and receiving container 600.

The light-generating unit 200 includes a circuit board 210 and a plurality of light sources 220 which may include point light sources. In exemplary embodiments, the circuit board 210 may have a plate-shape considered to be extended in one direction, such as substantially parallel with a longitudinal side of the backlight assembly 100. In one exemplary embodiment, a printed circuit board or a metal-coated substrate that is a printed circuit board coated with a metal of high thermal conductivity may be employed as the circuit board 210.

A plurality of lines (not shown) applying power provided from outside to a plurality of point light sources 220 is formed on the circuit board 210. In exemplary embodiments, the lines applying power to the point light sources 220 may be formed on a surface of the circuit board 210 and/or inside of the circuit board 210. The lines applying power to the point light sources 220 are electrically connected to a power-supplying device (not shown) and provide the point light sources 220 with the power.

The point light sources 220 (hereinafter, referred to as light-emitting diodes (LEDs) are formed on the circuit board 210 with a substantially equal or constant distance between each other. The light-emitting diodes 220 generate a light substantially in a shape of a point. The light-emitting diodes 220 may include colored light-emitting diodes. These colored light-emitting diodes may include red light-emitting diodes emitting red light, green light-emitting diodes emitting green light and blue light-emitting diodes emitting blue light. In exemplary embodiments, the red light-emitting diodes, green light-emitting diodes and blue light-emitting diodes are alternately disposed on the circuit board 210. In other exemplary embodiments, the light-emitting diodes 220 may further include a white light-emitting diode emitting white light.

Referring to FIG. 2, the light-generating unit 200 includes the light sources 220 disposed on the circuit board 210. The light-generating unit 200 further includes an optical lens 230 surrounding each of the light-emitting diodes 220. The optical lens 230 refracts a light generated by the light-emitting diode 220 and diffuses the light.

In exemplary embodiments, the backlight assembly may include a plurality of light-generating units 200. In one exemplary embodiment, the light-generating units 200 may be spaced apart from each other with a substantially equal or constant distance and/or disposed in substantially in parallel to each other to uniformly provide light. The planar-like circuit boards 210 of the multiple light-generating units 200 may be substantially equal or similar in shape and/or dimensions. In alternative exemplary embodiments, the light-generating units 200 may be any combination of dimensions, spacing and arrangement as is suitable for the purposes described herein.

The light guiding member 300 is disposed over the light-generating unit 200 and the light guiding member 300 is spaced apart from the light-generating unit 200. The light guiding member 300 may mix red, green and blue lights generated by the light-generating unit 200 to generate white light and essentially emits the white light. In one exemplary embodiment, the light guiding member 300 may include poly methyl methacrylate (PMMA).

The optical member 400 is disposed over the light guiding member 300. The optical member 400 is spaced apart from the light guiding member 300 by a predetermined distance in order to completely mix red, green and blue lights. The optical member 400 includes a diffusing member 410, such as a diffusing plate and an optical part 420, such as an optical sheet. The diffusing plate 410 diffuses light exiting from the light guiding member 300. The optical sheet 420 is disposed over the diffusing plate 410.

The diffusing plate 410 diffuses light exiting from the light guiding member 300 and enhances luminance uniformity. The diffusing plate 410 may have a substantially plate-shape including a certain thickness. In one exemplary embodiment, the diffusing plate 410 may include PMMA and/or a diffusion material contained in PMMA for enhancing a light diffusion.

In exemplary embodiments, the optical sheet 420 may include a condensing sheet (not shown). The condensing sheet condenses light diffused by the diffusing plate 410 toward a front direction of the backlight assembly 100 to enhance a front-view luminance. In another exemplary embodiment, the optical sheet 420 may include a diffusing sheet. The diffusing sheet diffuses light diffused by the diffusing plate 410 once again. In alternative embodiments, configurations of the optical member may further include various optical sheets according to required luminance properties.

The heat-radiation member 500 is disposed under the light-generating unit 200. In exemplary embodiments, the heat-radiation member 500 may include a substantially rectangular plate shape. The heat-radiation member 500 radiates heat generated by the light-generating unit 200 into the air.

The heat-radiation member 500 is composed of a material having high heat conductivity and excellent electrical insulating properties so as to radiate heat generated by the light-generating unit 200 into the air. In exemplary embodiments, the heat-radiation member 500 may include boron nitride (BN), silicon carbide (SiC), magnesium oxide (MgO) and any combination including at least one of the foregoing. In alternative exemplary embodiments, the heat-radiation member 500 may include a mixture of graphite and one of BN, SiC and MgO at a fixed rate.

The heat-radiation member 500 including the above-mentioned materials may have a weak surface strength, such that a surface of the heat-radiation member 500 may be easily scratched. In one exemplary embodiment, the heat-radiation member 500 may further include a surface strength enhancing material.

The receiving container 600 is disposed under the heat-radiation member 500. In one exemplary embodiment, the receiving container 600 includes a metal, such as aluminum. The receiving container 600 includes a bottom portion 602 and a side portion 604 extended from the bottom portion 602. The bottom portion 602 and the side portion 604 define a receiving space. The heat-radiation member 500, the light-generating unit 200, the light guiding member 300 and the optical member 400 may be received in the receiving space in sequence.

The receiving container 600 includes a structure for effective heat radiation of the heat-radiation member 500. In detail, the receiving container 600 has an opening 606 that is formed through removing a portion of the bottom portion 602.

The opening 606 is formed in a region corresponding to the light-emitting diodes 220 of the light-generating unit 200. In one exemplary embodiment, the opening 606 has a substantially rectangular shape. The opening 606 may be disposed in a matrix-shape corresponding to light-emitting diodes 220. In another exemplary embodiment, the number of the openings 606 is equal to that of the light-emitting diodes 220.

In alternative exemplary embodiments, the number of the openings 606 may be smaller than that of the light-emitting diodes 220. When the number of the openings 606 is smaller than that of the light-emitting diodes 220, a size of the opening 606 may become increased.

The opening 606 formed in the bottom portion 602 of the receiving container 600 essentially exposes the heat-radiation member 500 received in the receiving space to the outside. When the heat-radiation member 500 is exposed, heat transferred to the heat-radiation member 500 is more quickly dissipated. Advantageously, efficiency of radiation of heat of a backlight assembly is enhanced.

According to the present embodiment, the heat-radiation member 500 is received in the receiving container 600. Additionally, when the backlight assembly 100 is assembled, scratching may be reduced or effectively prevented.

Referring again to FIG. 2, the receiving container 600 includes a first stepped portion 607 and a second stepped portion 608 which are formed in side portion 604. The light guiding member 300 is supported by the first stepped portion 607, so that the light guiding member 300 may be spaced apart from the light-generating unit 200. The optical member 400 including the diffusing plate 410 and the optical sheet 420 is supported by the second stepped portion 608, so that the optical member 400 may be spaced apart from the light guiding member 300.

Although the opening 606 is described and illustrated as having a substantially rectangular-shape, the opening 606 may have various shapes and/or dimensions.

Figure 3:
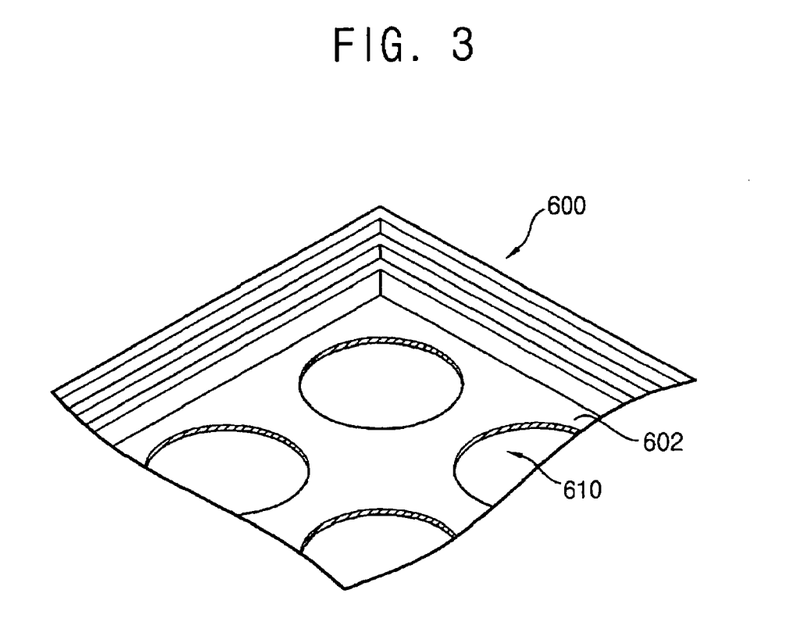
FIG. 3 is a perspective view illustrating an exemplary embodiment of a shape of an opening.

FIG. 3 is a perspective view illustrating an exemplary embodiment of a shape of an opening.

Referring to FIG. 3, an opening 610 of a receiving container 600 is formed through removing a portion of the bottom portion 602. The opening 610 is illustrated with a substantially circular shape. The opening 610 corresponds in position in the receiving container 600 to the light-emitting diode 220 (referring to FIG. 1). The opening 610 having a circular shape has substantially the same function as that of the opening 606 shown in FIG. 1 and FIG. 2.

Figure 4:
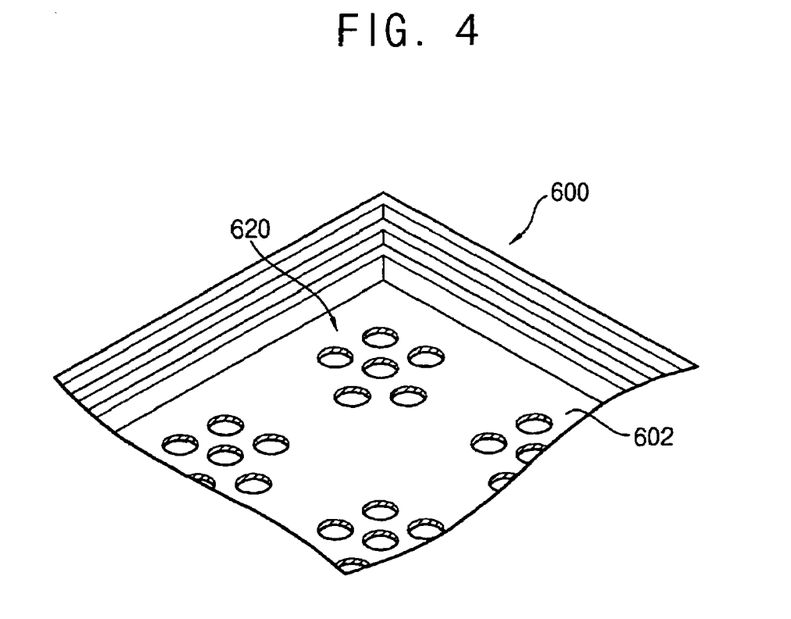
FIG. 4 is a perspective view illustrating another exemplary embodiment of a shape of an opening.

FIG. 4 is a perspective view illustrating another exemplary embodiment of a of an opening.

Referring to FIG. 4, bottom portion 602 of the receiving container 600 includes an opening 620. The opening 620 includes a plurality of holes arranged in a specific shape. The holes are formed through removing a portion of the bottom portion 602. The holes form the opening 620 having a substantially circular shape of which a radius of the opening 620 is smaller than that of the opening 610 in FIG. 3. The opening 620 having the above-mentioned structure has the same function as the opening shown in FIG. 1 and FIG. 2. Alternative exemplary embodiments include configurations where the holes may vary in dimension, shape, quantity and/or arrangement.

Figure 5:
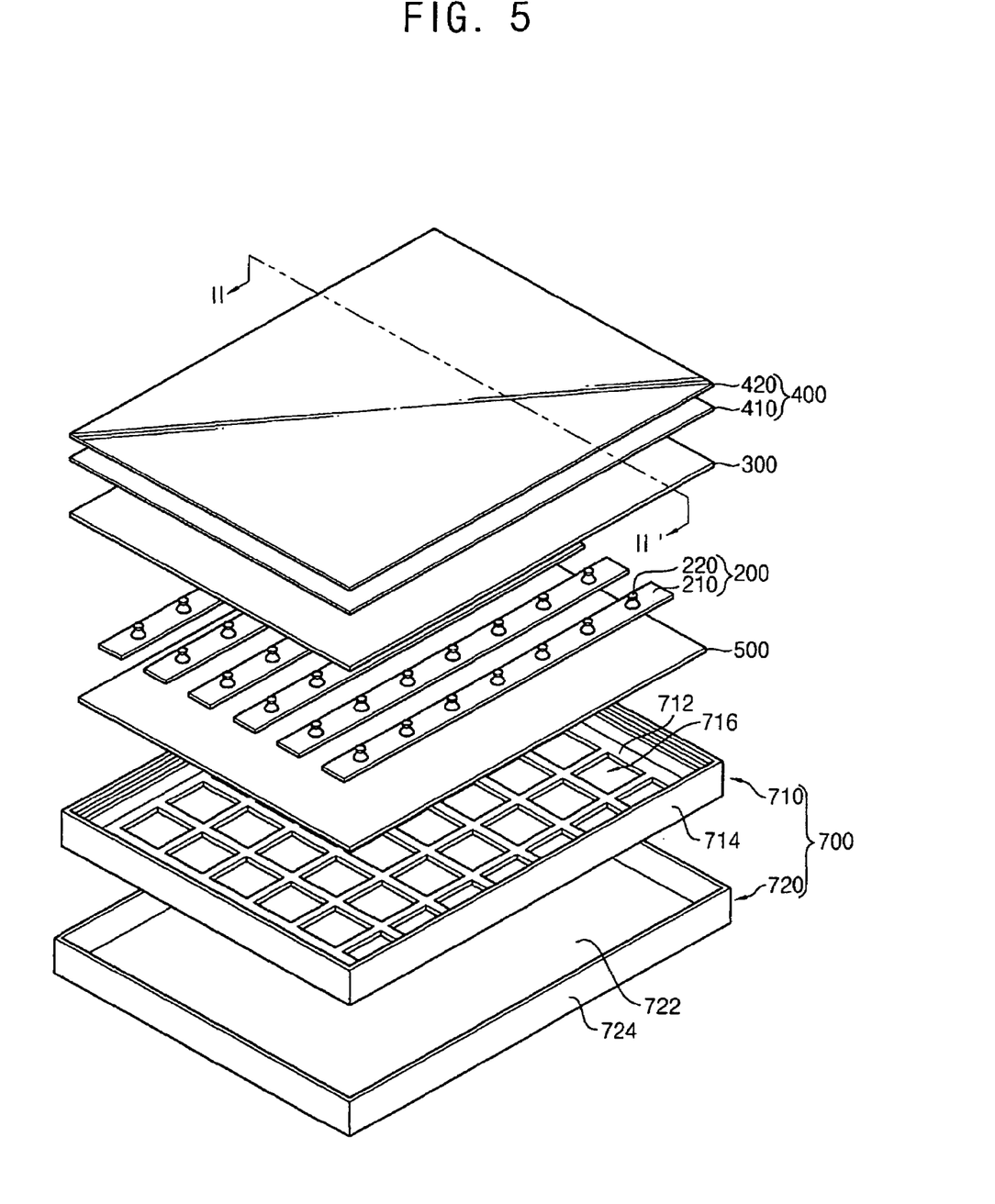
FIG. 5 is an exploded perspective view illustrating another exemplary embodiment of a backlight assembly according to the present invention.
Figure 6:
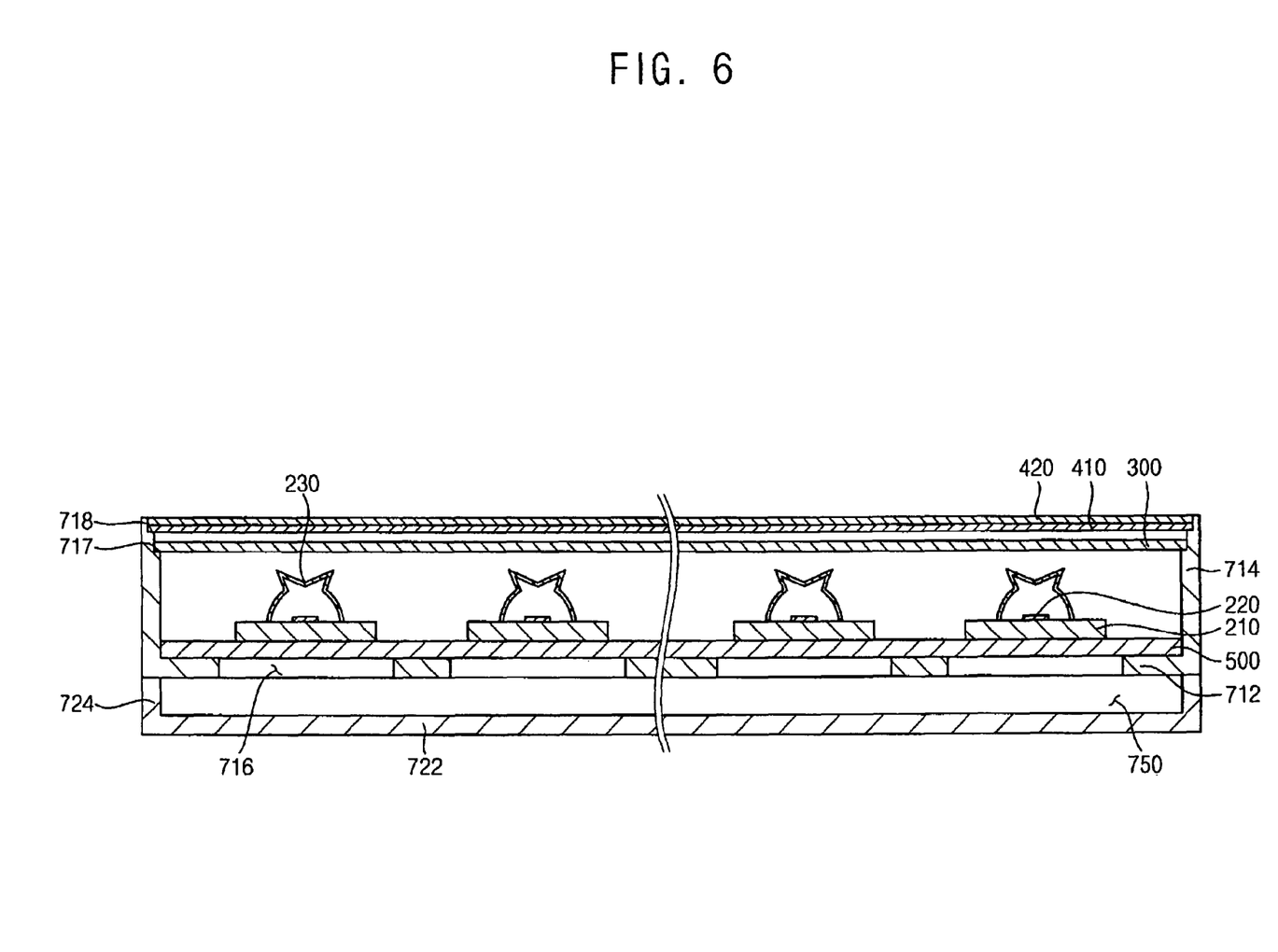
FIG. 6 is a cross-sectional view taken along line II-II' shown in FIG. 2.

FIG. 5 is an exploded perspective view illustrating another exemplary embodiment of a backlight assembly according to the present invention. FIG. 6 is a cross-sectional view taken along line II-II' shown in FIG. 2.

Referring to FIG. 5 and FIG. 6, a backlight assembly includes a light-generating unit 200, a light guiding member 300, an optical member 400, a heat-radiation member 500 and a receiving member 700. The backlight assembly in FIGS. 5 and 6 is the same as that in FIGS. 1 and 2 except for the receiving member 700. Thus, the same reference numerals will be used to refer to the same or like parts as those described in FIGS. 1 and 2, and any further explanation concerning the above elements will be omitted.

The receiving member 700 includes a first receiving container 710 and a second receiving container 720. In one exemplary embodiment, the first and second receiving containers 710 and 720 include metal. The first receiving container 710 includes a first bottom portion 712 and a first side portion 714 extended from the first bottom portion 712. The first bottom portion 712 and the first side portion 714 define a first receiving space. The heat-radiation member 500, the light-generating unit 200, the light guiding member 300, and the optical member 400 are sequentially received in the first receiving space.

The first receiving container 710 has a certain structure so that the heat-radiation member 500 efficiently radiates heat generated by the light-generating unit 200. In other word, the first receiving container 710 has an opening 716 that is formed through removing a portion of the first bottom portion 712.

The opening 716 is formed in a region corresponding in location and dimension to light-emitting diodes 220 of the light-generating unit 200. The opening 716 has a substantially rectangular shape. The opening 716 is disposed in a matrix-shape corresponding to the light-emitting diodes 220. In one exemplary embodiment, the number of the openings 716 is equal to that of the light-emitting diodes 220.

The opening 716 formed in the first bottom portion 712 of the first receiving container 710 essentially exposes the heat-radiation member 500 received in the first receiving space to the outside of the backlight assembly. When the heat-radiation member 500 is exposed, heat transferred to the heat-radiation member 500 is more quickly dissipated.

The second receiving container 720 is disposed under the first receiving container 710. The second receiving container 720 includes a second bottom portion 722 and a second side portion 724 extended from the second bottom portion 722. The second bottom portion 722 and the second side portion 724 define a second receiving space. In alternative exemplary embodiments, elements of the backlight assembly may or may not be received in the second receiving space. In a preferred exemplary embodiment, elements of the backlight assembly are not received in the second receiving space.

The second receiving container 720 is disposed under the first receiving container 710, so that the first and second receiving containers 710 and 720 are spaced apart from each other. An air layer 750 is formed between the first and second receiving containers 710 and 720. The air layer 750 has a thickness corresponding to a height of the second side portion 724 is defined between bottom portions of the first and second receiving containers 710 and 720. The heat-radiation member 500 exposed through the opening 716 makes contact with the air layer 750.

The heat-radiation member 500 is exposed through the opening 716 of the first receiving container 710 and the heat-radiation member 500 makes contact with the air layer 750 defined in the second receiving space of the second receiving container 720. Advantageously, efficiency of heat-radiation is enhanced.

In an exemplary embodiment, heat generated by the light-generating unit 200 is conveyed to the heat-radiation member 500. The heat-radiation member 500 diffuses the heat and evenly disperses the heat. The heat dispersed evenly by the heat-radiation member 500 makes direct contact with the air layer 750 through the opening 716 of the first receiving container 710. An air circulation of the air layer 750 disperses the heat more evenly and the heat is more quickly dissipated through the second bottom portion 722 of the second receiving container 720.

Referring again to FIG. 6, the first receiving container 710 includes a first stepped portion 717 and a second stepped portion 718 which are formed in side portion 714. The light guiding member 300 is supported by the first stepped portion 717, so that the light guiding member 300 may be spaced apart from the light-generating unit 200. The optical member 400 including the diffusing plate 410 and the optical sheet 420 is supported by the second stepped portion 718, so that the optical member 400 may be spaced apart from the light guiding member 300.

Figure 7:
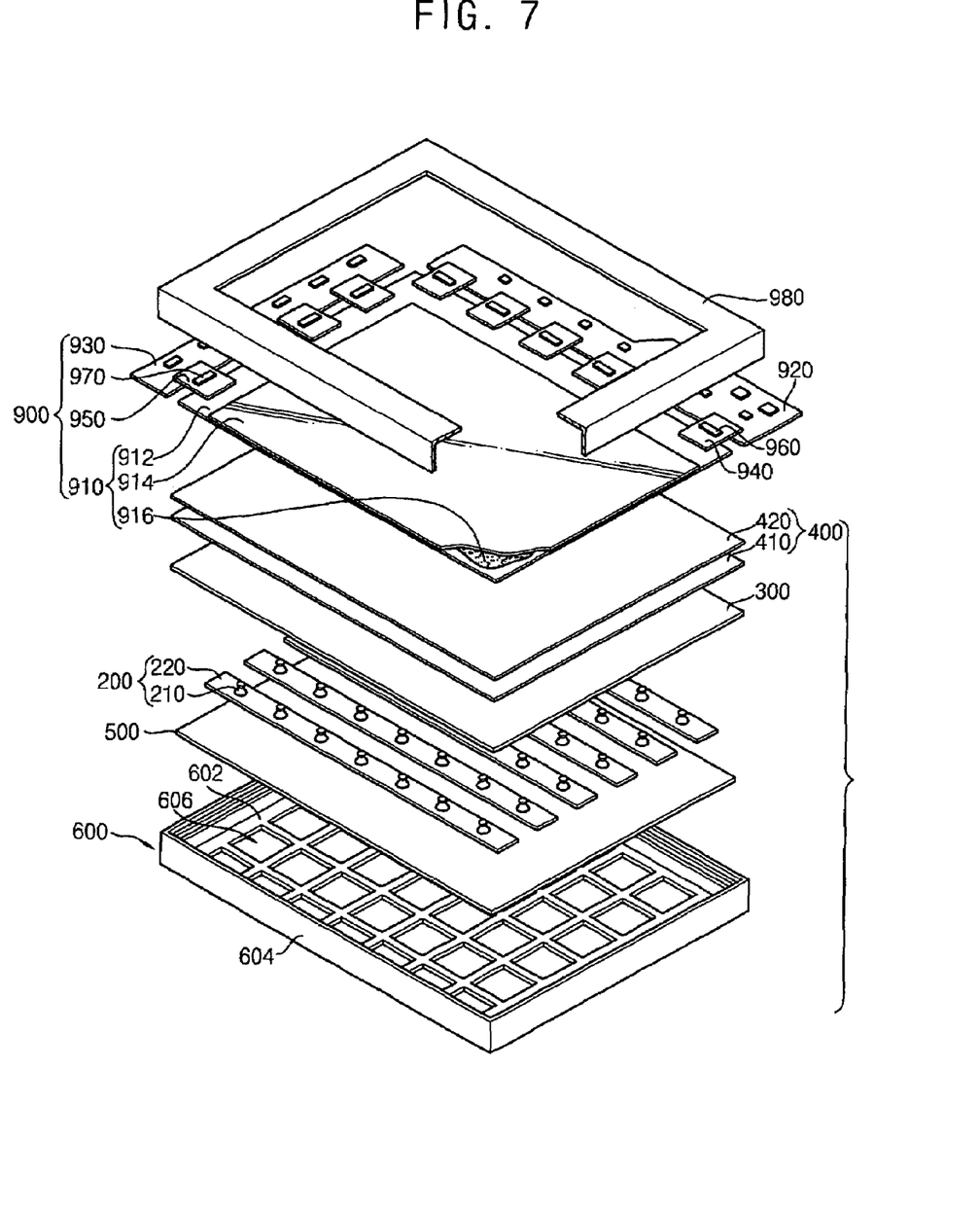
FIG. 7 is an exploded perspective view illustrating an exemplary embodiment of a display device having the backlight assembly.

FIG. 7 is an exploded perspective view illustrating an exemplary embodiment of a display device having the backlight assembly.

Referring to FIG. 7, a display device includes a backlight assembly 100 and a display unit 900. The backlight assembly is the same as the backlight assembly shown in FIG. 1 and FIG. 2. Thus the same reference numerals will be used to refer to the same elements and any further explanation of the same elements will be omitted.

The backlight assembly 100 includes a light-generating unit 200, a heat-radiation member 500 and a receiving container 600. The light-generating unit 200 generates light. The heat-radiation member 500 radiates heat generated by the light-generating unit 200. The receiving container 600 receives the light-generating unit 200 and the heat-radiation member 500. The backlight assembly further includes a light guiding member 300 and an optical member 400.

The receiving container 600 includes a bottom portion 602 and a side portion 604. The receiving container 600 has an opening 606 formed through removing a portion of the bottom portion 602, so that the heat-radiation member 500 received in the receiving container 600 is exposed to the outside. When the heat-radiation member 500 is exposed through the opening 606, heat is more quickly dissipated.

Alternative exemplary embodiments may include configurations where the backlight assembly 100 may include a first receiving container 710 and a second receiving container 720 like the backlight assembly shown in FIGS. 5 and 6. The first receiving container 710 has an opening 716 formed through removing a portion of the first bottom portion 712. The second receiving container 720 is disposed under the first receiving container 710, so that the first and second receiving containers 710 and 720 are spaced apart from each other. Therefore, an air layer 750 is formed between the first and second receiving containers 710 and 720. Thus, the heat-radiation member 500 makes direct contact with the air layer 750 through the opening 716. Therefore, heat transferred to the heat-radiation member 500 is more evenly dispersed by air circulation of the air layer 750 and the heat is quickly dissipated.

Referring again to FIG. 7, the display unit 900 includes a liquid crystal display panel 910, a source printed circuit board 920 and a gate printed circuit board 930. The liquid crystal display panel 910 displays images. The source printed circuit board 920 and the gate printed circuit board 930 apply driving signals to drive the liquid crystal display panel 910.

The driving signals provided by the source and the gate printed circuit boards 920 and 930 are applied to the liquid crystal display panel 910 through a date flexible circuit film 940 and a gate flexible circuit film 950, respectively. In one exemplary embodiment, the date and the gate flexible circuit films include a tape carrier package (TCP) and/or a chip on film (COF).

The source printed circuit board 920 and the gate printed circuit board 930 apply driving signals to the data flexible circuit film 940 and the gate flexible circuit film 950, respectively. The date and the gate flexible circuit films 940 and 950 further may include a date driving chip 960 and a gate driving chip 970 respectively to timely apply the driving signals to the liquid crystal display panel 910.

The liquid crystal display panel 910 includes a thin film transistor (TFT) substrate 912, a color filter substrate 914 and a liquid crystal layer 916. The color filter substrate 914 is opposite to the TFT substrate 912 and coupled with the TFT substrate 912. The liquid crystal layer 916 is disposed between the TFT substrate 912 and the color filter substrate 914.

In one exemplary embodiment, the TFT substrate 912 includes a transparent glass substrate and a plurality of TFTs (not shown) arranged on the transparent glass substrate. The TFTs correspond to a switching device. Source terminals of the TFTs are electrically connected to date lines, and gate terminals of the TFTs are electrically connected to gate lines. Pixel electrodes are electrically connected to drain terminals of the TFTs. The pixel electrodes include optically transparent and electrically conductive materials.

The color filter substrate 914 is opposite to the TFT substrate 912 and spaced apart from the TFT substrate 912 by a fixed interval. The color filter substrate 914 may be formed through a thin film process of RGB pixel. The RGB pixel is a color pixel (not shown) that produces a color when a light passes through the RGB pixel. A common electrode (not shown) is formed on the color filter substrate 914. The common electrode may include optically transparent and/or electrically conductive materials.

When a power is applied to the gate terminal of the TFT, the TFT is turned on. When the TFT is turned on, electric field is generated between the pixel electrodes and the common electrode to induce rearrangement of liquid crystal molecules of the liquid crystal layer disposed between the TFT substrate 912 and the color filter substrate 914. As a result, an optical transmittance of the liquid crystal layer is changed to display images.

The source printed circuit board 920 is connected to a first edge portion of the TFT substrate 912 through the data flexible circuit film 940. The gate printed circuit board 930 is connected to a second edge portion of the TFT substrate 912 through the gate flexible circuit film 950. The source printed circuit board 920 and the gate printed circuit board 930 generate driving signals to drive the liquid crystal display panel 910 and output the driving signals.

The date driving signals control the date lines of the TFT substrate 912. The date driving signals are applied to the data lines through the data flexible circuit film 940. The gate driving signals control the gate lines of the TFT substrate 912. The gate driving signals are applied to the gate lines through the gate flexible circuit film 950. Conducting lines (not shown) that connect the data flexible circuit film 940 to the gate flexible circuit film 950 are formed on the TFT substrate 912.

The display unit 900 is disposed over an upper portion of the backlight assembly 100. The date flexible circuit film 940 is bent, so that the source printed circuit board 920 is disposed under the receiving container 600.

The top chassis 980 surrounds an edge of the liquid crystal display panel 910 received in the backlight assembly 100, and is combined with the receiving container 600. The top chassis 980 protects the liquid crystal display panel 910. The top chassis 980 prevents a separation of the liquid crystal display panel 910 from the receiving container 600 also.

Although exemplary embodiments of the liquid crystal display device have been described, it may be applied to another type of display device.

An exemplary embodiment includes a receiving container having an opening that exposes a heat-radiation member. Alternative exemplary embodiments of the backlight assembly include a first receiving container and a second receiving container disposed under the first receiving container to form an air layer between the first and second receiving containers.

The heat-radiation member is exposed to the outside or makes direct contact with the air layer through the opening. Advantageously, the heat transferred to the heat-radiation member is easily dissipated.

In another exemplary embodiment, heat that is generated by the light-generating unit and transferred to the heat-radiation member is dispersed once more by the air layer and transferred to the second receiving container. Advantageously, efficiency of radiation of heat is enhanced. A lowering of luminance caused by the heat is reduced or effectively prevented, thereby enhancing display quality of the display device.

In another exemplary embodiment, the heat-radiation member is received by the first receiving container, so that efficiency of heat-radiation is enhanced, and the heat-radiation member is protected from being scratched. Additionally, ease of assemblage may also be facilitated.

This invention has been described with reference to the example embodiments. It is evident, however, that many alternative modifications and variations will be apparent to those having skill in the art in light of the foregoing description. Accordingly, the present invention embraces all such alternative modifications and variations as fall within the spirit and scope of the appended claims. Although the exemplary embodiments of the present invention have been described, it is understood that the present invention should not be limited to these exemplary embodiments but various changes and modifications may be made by one ordinary skilled in the art within the spirit and scope of the present invention as hereinafter claimed.

What is claimed is:

1. A backlight assembly comprising:
  a light-generating unit comprising a plurality of light sources generating light;
  a heat-radiation member disposed under the light-generating unit and radiating heat generated by the light-generating unit;
  a first receiving container receiving the heat-radiation member, the first receiving container comprising a bottom portion and a side portion extended from the bottom portion, the bottom portion comprising opening parts each extending completely through the bottom portion, and exposing a portion of the heat-radiation member, and each overlapping with a light source of the plurality of light sources, and a second receiving container disposed under the first receiving container and forming an air layer between the first and second receiving containers, wherein the heat-radiation member is disposed between the plurality of light sources and the opening parts, and covers an entire of the opening parts of the first receiving container.

2. The backlight assembly of claim 1, wherein the plurality of light sources comprises point light sources.

3. The backlight assembly of claim 1, wherein each of the plurality of light sources is surrounded by an optical lens.

4. The backlight assembly of claim 1, wherein the first and second receiving containers comprise metal.

5. The backlight assembly of claim 1, wherein the each of the opening parts overlaps an entire of the light source.

6. The backlight assembly of claim 1, wherein each of the opening parts has a rectangular hole shape.

7. The backlight assembly of claim 1, wherein each of the opening parts has a circular hole shape.

8. The backlight assembly of claim 1, wherein each of the opening parts comprises a plurality of holes.

9. The backlight assembly of claim 8, wherein the opening parts are arranged so that the opening parts correspond to the light sources.

10. The backlight assembly of claim 8, wherein the plurality of holes are arranged in a substantially circular pattern.

11. The backlight assembly of claim 1, further comprising a light guiding member disposed over the light-generating unit and mixing light generated by the light-generating unit.

12. The backlight assembly of claim 11, further comprising an optical member disposed over the light guiding member and enhancing optical properties of light provided by the light guiding member.

13. The backlight assembly of claim 1, the light-generating unit comprising a circuit board, wherein the plurality of light sources is disposed on the circuit board.

14. The backlight assembly of claim 13, wherein the light sources comprise red light-emitting diodes, green light-emitting diodes, and blue light-emitting diodes.

15. A backlight assembly comprising:
a light-generating unit generating a light with a plurality of point light sources;
a heat-radiation member disposed under the light-generating unit and radiating heat generated by the light-generating unit;
a first receiving container comprising a bottom portion and a side portion extended from the bottom portion, the bottom portion having a plurality of opening parts exposing a portion of the heat-radiation member; and
a second receiving container disposed under the first receiving container and forming an air layer between the first and second receiving containers,
wherein the heat-radiation member is disposed between the plurality of point light sources and the plurality of opening parts, and covers an entire of the plurality of opening parts of the first receiving container.

16. The backlight assembly of claim 15, further comprising a plurality of the light-generating unit, the plurality of the light-generating unit disposed at a substantially equal distance and substantially parallel to each other.

17. A display device comprising:
a backlight assembly comprising:
a light-generating unit generating a light with a plurality of light sources;
a heat-radiation member disposed under the light-generating unit and radiating heat generated by the light-generating unit; and
a first receiving container comprising a bottom portion and a side portion extended from the bottom portion, the bottom portion having a plurality of opening parts extending completely through the bottom portion and exposing a portion of the heat-radiation member; and
a second receiving container which is disposed under the first receiving container and forms an air layer between the first and second receiving containers,
a display panel disposed over an upper portion of the light-generating unit and displaying images with the light,
wherein the plurality of light sources is disposed between the display panel and the plurality of opening parts, and
wherein the heat radiation member overlaps an entire of the plurality of opening parts of the first receiving container.

18. The display device of claim 17, wherein each of the plurality of light sources is surrounded by an optical lens.

* * * * *